US005526012A

United States Patent [19]

Shibahara

[11] Patent Number: 5,526,012

[45] Date of Patent: Jun. 11, 1996

[54] METHOD FOR DRIVING ACTIVE MATRIS LIQUID CRYSTAL DISPLAY PANEL

[75] Inventor: Hideo Shibahara, Tokyo, Japan

[73] Assignee: NEC Corporation, Tokyo, Japan

[21] Appl. No.: 216,728

[22] Filed: Mar. 23, 1994

[30] Foreign Application Priority Data

Mar. 23, 1993 [JP] Japan .................................. 5-062290

[51] Int. Cl.$^6$ ................................................ G02F 1/33

[52] U.S. Cl. ................................................ 345/92; 345/94

[58] Field of Search ................................ 345/92, 93, 94, 345/95; 359/54, 58, 59

[56] References Cited

U.S. PATENT DOCUMENTS

| | | | |
|---|---|---|---|
| 4,818,991 | 4/1989 | Gay | 345/92 |
| 4,955,697 | 9/1990 | Tsukada et al. | 345/92 |
| 5,177,475 | 1/1993 | Stephany et al. | 345/92 |
| 5,296,847 | 3/1994 | Takeda et al. | 345/92 |

FOREIGN PATENT DOCUMENTS

| | | |
|---|---|---|
| 0536744 | 4/1993 | European Pat. Off. . |
| 335218 | 2/1991 | Japan . |

*Primary Examiner*—Richard Hjerpe
*Assistant Examiner*—Kara Farnandez Stoll

[57] ABSTRACT

In a method for driving an active matrix liquid crystal display panel, a selection signal composed of a scan signal superimposed with a modulation signal is sequentially supplied to the scan signal lines one by one, so as to turn on the thin film transistors connected to the scan signal line applied with the selection signal so that a video signal is applied from each of the video signal lines through the associated turned-on thin film transistor to the corresponding pixel electrode and stored in the corresponding storage capacitor, whereby an image is displayed. The selection signal is configured to assume a first potential which is a high voltage, a second potential which is lower than the first potential, and a third potential which is lower than the second potential. The selection signal is controlled in a given frame to elevate from the second potential to the first potential so that the selection signal is maintained at the first potential during one horizontal scan period, and then, to drop to the third potential so that the selection signal is maintained at the first potential during two horizontal scan periods, and thereafter, to return to the second potential so that the selection signal is maintained at the second potential until a next frame.

4 Claims, 5 Drawing Sheets

GATE SIGNAL
(SELECTION SIGNAL XG)
ON (n)th SCAN
SIGNAL LINE
VDD
Vg
VEE1
VEE2
Vx

GATE SIGNAL
(SELECTION SIGNAL XG)
ON (n+1)th SCAN
SIGNAL LINE
VDD
Vg
VEE1
VEE2
Vx

SOURCE VOLTAGE
(VIDEO SIGNAL)
Vs
Vsc
HIGH
LEVEL
LOW
LEVEL

ΔV3
ΔV1
ΔV2
Vs
HIGH
LEVEL
Vsc
ΔV3
Vd
ΔV1
ΔV2
Vs
LOW
LEVEL
DRAIN VOLTAGE
(PIXEL ELECTRODE
VOLTAGE)
A B C D
E F G

METHOD FOR DRIVING ACTIVE MATRIS LIQUID CRYSTAL DISPLAY PANEL

BACKGROUND OF THE INVENTION

1. Field of the Invention

The present invention relates to a semiconductor integrated circuit for driving a liquid crystal display panel, and more specifically to a method for driving an active matrix liquid crystal display panel having a TFT (thin film transistor) associated to each display element.

Description of Related Art

Liquid crystal display devices have various excellent features in comparison with other display devices such as a plasma display panel (PDP) and electrochemical display (ECD). For example, the liquid crystal display devices is suitable to be driven with a battery cell, since it needs only as small consumed power as a few microwatts per square centimeter. In addition, the liquid crystal display devices can be driven with a semiconductor circuit since it has only an operating voltage on the order of a few volts. Therefore, these features enable a flat screen display in combination with a semiconductor integrated circuit. Furthermore, as a matter of course in the display, a scale-up of the display size, a high definition and a multi-coloring have been demanded. To improve a contrast for satisfying these demands, there was proposed an active matrix display panel using a TFT associated with each of pixels.

For example, Japanese Patent Application Laid-open Publication 3P-A-03-035218 proposes one typical conventional method for driving a liquid crystal display panel. In this proposed method, for an AC driving of the liquid crystal display, a DC voltage to be applied is inverted from one field to another. In addition, each liquid crystal pixel or cell inevitably has a parasitic capacitance between a pixel electrode and a scan signal line and a video signal line.

Referring to FIG. 1, there is shown an equivalent circuit of one pixel of an active matrix liquid crystal display panel. In the drawing, Reference Signs Yn–1 and Yn designate a video signal line, and Reference Signs Xn–1 and Xn designate a scan signal line. These video signal lines and scan signal lines are arranged to form a matrix plane. At each of intersections between the video signal lines and the scan signal lines, one thin film transistor TFT is located. The shown thin film transistor TFT has a source (or drain) electrode connected to a corresponding video signal line Yn and a gate electrode connected to a corresponding scan signal line Xn. A drain (or source) electrode of the shown thin film transistor TFF is connected to a pixel electrode symbolically with a dot 10. A liquid crystal is sandwiched between this pixel electrode 10 and a not-shown opposing electrode which is in common to all pixels. Therefore, the liquid crystal itself has a capacitance $C_{LC}$. In addition, a not-shown storage capacitor is connected between the drain (or source) electrode of the shown thin film transistor TFT and a just preceding or succeeding scan signal line. Furthermore, each pixel involves a parasitic capacitance including capacitances $C_{X1}$, $C_{X2}$, $C_{Y1}$ and $C_{Y2}$ which are formed between the pixel electrode 10 and the scan signal lines Xn and Xn–1 and the video signal lines Yn and Yn–1, respectively, and an overlap capacitance $C_{GS}$ between the gate electrode and a source region in the thin film transistor TFT. In addition, because of this capacitance $C_{GS}$, when a gate voltage changes from an ON voltage to an OFF voltage, a drain voltage drops, and correspondingly, a voltage applied to the pixel electrode drops.

Now, operation will be described with reference to a waveform diagram of FIG. 2 illustrating a change in voltage in various electrodes when the active matrix liquid crystal display panel is driven. In FIG. 2, Vd, Vsc, Vs and Vg indicate a potential of the pixel electrode 10, a voltage of the opposing electrode, and a source voltage and a gate voltage of the thin film transistor TFT, respectively.

When the gate voltage Vg is at a high level, the pixel electrode 10 is charged to the source voltage Vs. Namely, the potential Vd of the pixel electrode 10 becomes as shown by a dot "A" on the voltage curve Vd. Then, when the gate voltage Vg drops to a low level or OFF voltage, the pixel electrode voltage Vd immediately drops by ΔV, as shown a dot "B" on the voltage curve Vd. This drop voltage ΔV is called a "feed-through" voltage, and can be expressed as follows, by assuming that the amount of voltage change in the scan signal (namely, the amplitude of the gate voltage) is ΔVg:

$$\Delta V=\Delta Vg\cdot\{C_{GS}/(G_{LC}+C_{GS})\}$$

In the above mentioned conventional technique, the change storage electrode (storage capacitor) is formed by utilizing a portion of the thin film transistor connected to the just preceding scan signal line. The above referred Japanese patent publication adopts a feed-through compensating method by supplying another modulation signal to a scan signal applied to the gate electrode of the thin film transistor for turning on the thin film transistor, and by changing the polarity of the modulation signal from an even-numbered thin film transistor gate electrode to an odd-numbered thin film transistor gate electrode and vice versa, and further, by inverting this relation of the modulation signal from an odd-numbered field to an even-numbered field and vice versa.

Referring to FIGS. 3A to 3E, there are shown waveform diagrams illustrating a change in voltage in various electrodes in the conventional feed-through compensating method. FIG. 3A shows the waveform of a signal applied to the gate electrode of the thin film transistor connected to an (n–1)th scan signal line Xn–1, and FIG. 3B shows the waveform of a signal applied to the gate electrode of the thin film transistor connected to an (n)th scan signal line Xn. FIG. 3C illustrates a constant voltage which is applied to the opposing electrode, and which is equal to an averaged value of a video signal voltage. FIG. 3D indicates the waveform of the video signal applied to the source electrode of the thin film transistor. FIG. 3E represents the change in voltage on the pixel electrode. As will be apparent, modulation signal voltage Vge is supplied to the gate electrode, in addition to the scan signal voltage Vg.

In accordance with the conventional feed-through compensating method shown in FIGS. 3A to 3E, now consider to make zero (0) the potential change on the pixel electrode caused by the capacitance coupling in a thin film transistor connected to an (n)th scan signal line in a given field. Assuming that a positive modulating signal and a negatived modulation signal in comparison to Vge=0 are Vge(+) and Vge(–), respectively, the gate-source capacitance of the thin film transistor is $C_{GS}$ and the capacitance of the storage capacitor is Cs, the voltage change ΔV on the pixel electrode can be expressed as follows:

$$\Delta V=-Vg\cdot CGS/Ct+Vge\cdot Cs/Ct$$

where $Ct=Cs+Ct+C_{LC}$

The potential change caused by the capacitance coupling in a thin film transistor connected to the (n)th scan signal line in a field next to the given field, can be expressed as follows:

$\Delta V=-Vg\cdot C_{GS}/Ct-Vge\cdot Cs/Ct$

Accordingly, since it is sufficient if both of the above equations are zero (0) in order to make zero the potential change in the odd-numbered fields and the even-numbered fields, Vge(−) and Vge(+) are determined to fulfill $Vge(+)=-Vg(C_{GS}/Cs)$ and $Vge(-)=Vg(C_{GS}/Cs)$.

FIG. 3E shows that the pixel electrode voltage does not change (at "A" and "B") during a period other than a transition period in which the scan signal voltage Vg and the modulation signal Vge are applied.

In the above mentioned conventional feed-through compensating method, however, the modulation signal has to be greatly changed not only from the even-numbered scan signal line to the odd-numbered scan signal line and vice versa, but also from the odd-numbered field to the even-numbered field and vice versa. Therefore, a driving circuit inevitably becomes complicated.

SUMMARY OF THE INVENTION

Accordingly, it is an object of the present invention to provide a method for driving an active matrix liquid crystal display panel, which has overcome the above mentioned defect of the conventional one.

Another object of the present invention is to provide a method for driving an active matrix liquid crystal display panel, which can compensate the feed-through voltage, with neither changing the modulation signal from the even-numbered scan signal line to the odd-numbered scan signal line and vice versa, nor changing the modulation signal from the odd-numbered field to the even-numbered field and vice versa.

The above and other objects of the present invention are achieved in accordance with the present invention by a method for driving an active matrix liquid crystal display panel which includes a plurality of video signal lines and a plurality of scan signal lines arranged in the form of a matrix, a plurality of thin film transistors each located on one of intersections between the video signal lines and the scan signal lines, each of the thin film transistor having its gate connected to a corresponding scan signal line, and a pair of source/drain electrodes, one of which is connected to a corresponding video signal line, the other of the pair of source/drain electrodes being connected to a storage capacitor and one of a pixel electrode, and a liquid crystal sandwiched between the pixel electrode and a common opposing electrode, the method comprising the step of sequentially supplying a selection signal composed of a scan signal superimposed with a modulation signal, to the scan signal lines one by one, so as to turn on the thin film transistors connected to the scan signal line applied with the selection Signal so that a video signal is applied from each of the video signal lines through the associated turned-on thin film transistor to the corresponding pixel electrode and stored in the corresponding storage capacitor, whereby an image is displayed, the selection signal being configured to assume a first potential which is a high voltage, a second potential which is lower than the first potential, and a third potential which is lower than the second potential.

In the case that the storage capacitor is connected between the other of the pair of source/drain electrodes and the gate of the thin film transistor connected to a just preceding scan signal line, the selection signal is controlled in a given frame to elevate from the second potential to the first potential so that the selection signal is maintained at the first potential during one horizontal scan period, and then, to drop to the third potential so that the selection signal is maintained at the third potential during two horizontal scan periods, and thereafter, to return to the second potential so that the selection signal is maintained at the second potential until a next frame.

With the above mentioned method, if the voltage of the pixel electrode equal to the video signal varies when the associated thin film transistor is brought from an ON condition to an OFF condition, the voltage of the pixel electrode is caused to returned to a voltage equal to the video signal when the selection signal is maintained at the third potential.

In the case tidal the storage capacitor is connected between the other of the pair of source/drain electrodes and the gate of the thin film transistor connected to a just succeeding scan signal line, the selection signal is controlled in a given frame to drop from the second potential to the third potential so that the selection signal is maintained at the third potential during two horizontal scan periods, and then, to elevate to the first potential so that the selection signal is maintained at the first potential during one horizontal scan period, and thereafter, to return to the second potential so that the selection signal is maintained at the second potential until a next frame.

With the above mentioned method, if the voltage of the pixel electrode equal to the video signal varies when the associated thin film transistor is brought from an ON condition to an OFF condition, the voltage of the pixel electrode is caused to returned to a voltage equal to the video signal when the selection signal is maintained at the first potential.

The above and other objects, features and ;advantages of the present invention will be apparent from the following description of preferred embodiments of the invention with reference to the accompanying drawings.

DESCRIPTION OF THE PREFERRED EMBODIMENTS

Figure 4A:
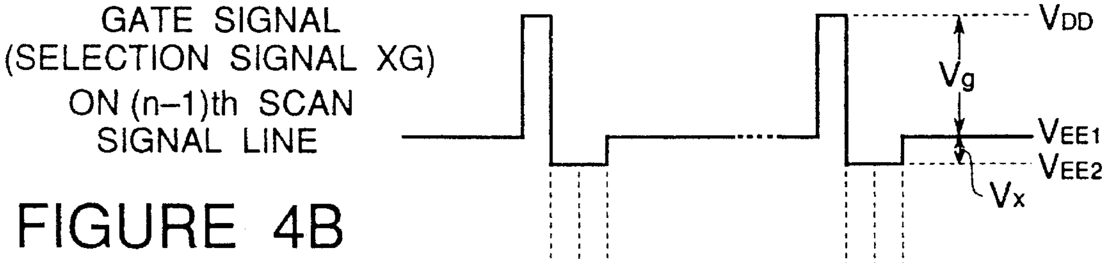
FIGS. 4A to 4D are waveform diagrams illustrating a change in voltage in various electrodes of one pixel in the active matrix liquid crystal display panel in accordance with a first embodiment of the active matrix liquid crystal display panel driving method in accordance with the present invention.
Figure 4B:
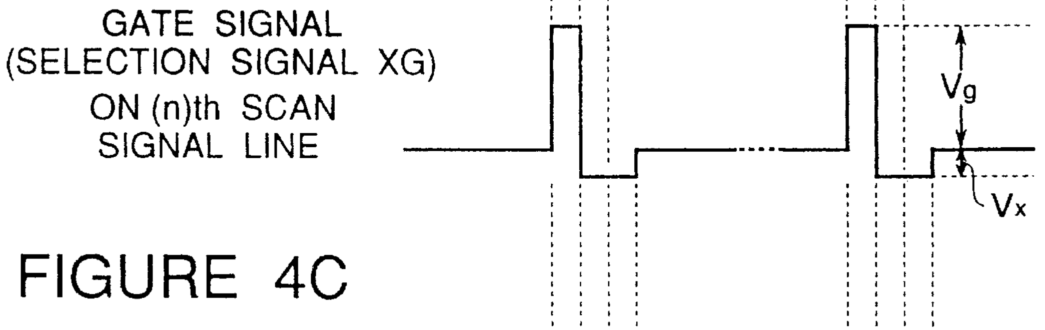
Figure 4C:
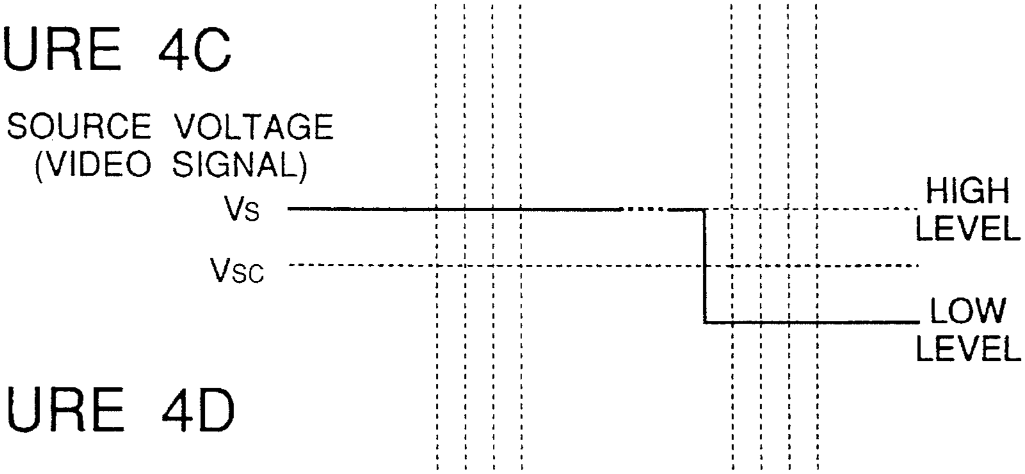
Figure 4D:
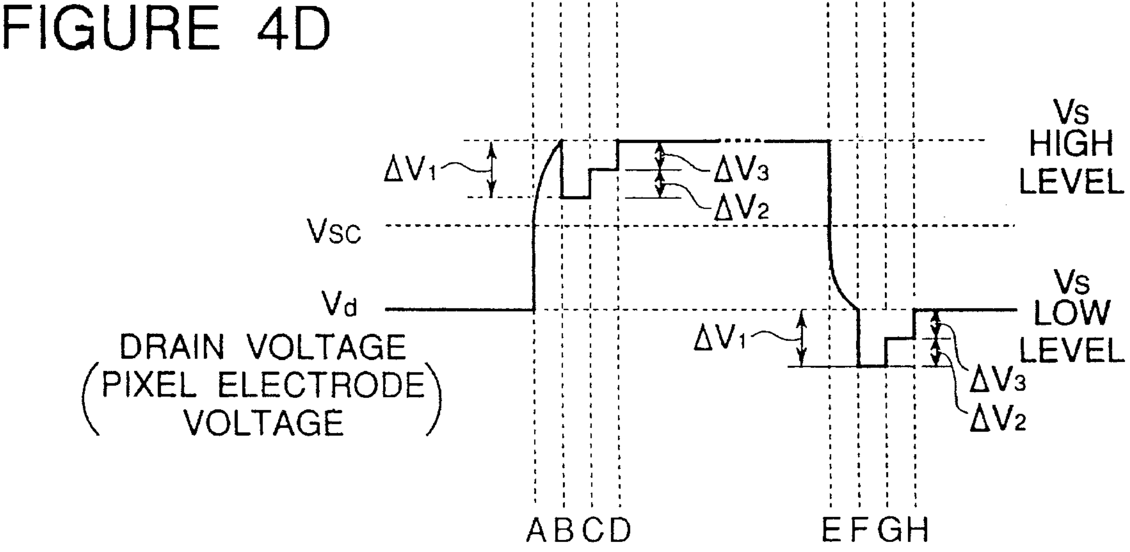

Referring to FIGS. 4A to 4D, there are shown waveform diagrams illustrating a change in voltage in various electrodes of one pixel in the active matrix liquid crystal display panel in accordance with a first embodiment of the active matrix liquid crystal display panel driving method in accordance with the present invention. FIG. 4A shows the waveform of a signal applied to the gate electrode of the thin film transistor connected to an (n−1)th scan signal line Xn−1, and FIG. 4B shows the waveform of a signal applied to the gate electrode of the thin film transistor connected to an (n)th scan signal line Xn. FIG. 4C indicates the waveform of the video signal on the video signal line Yn applied to the source electrode of the thin film transistor, and FIG. 4D illustrates the change in voltage on the pixel electrode.

Figure 1:
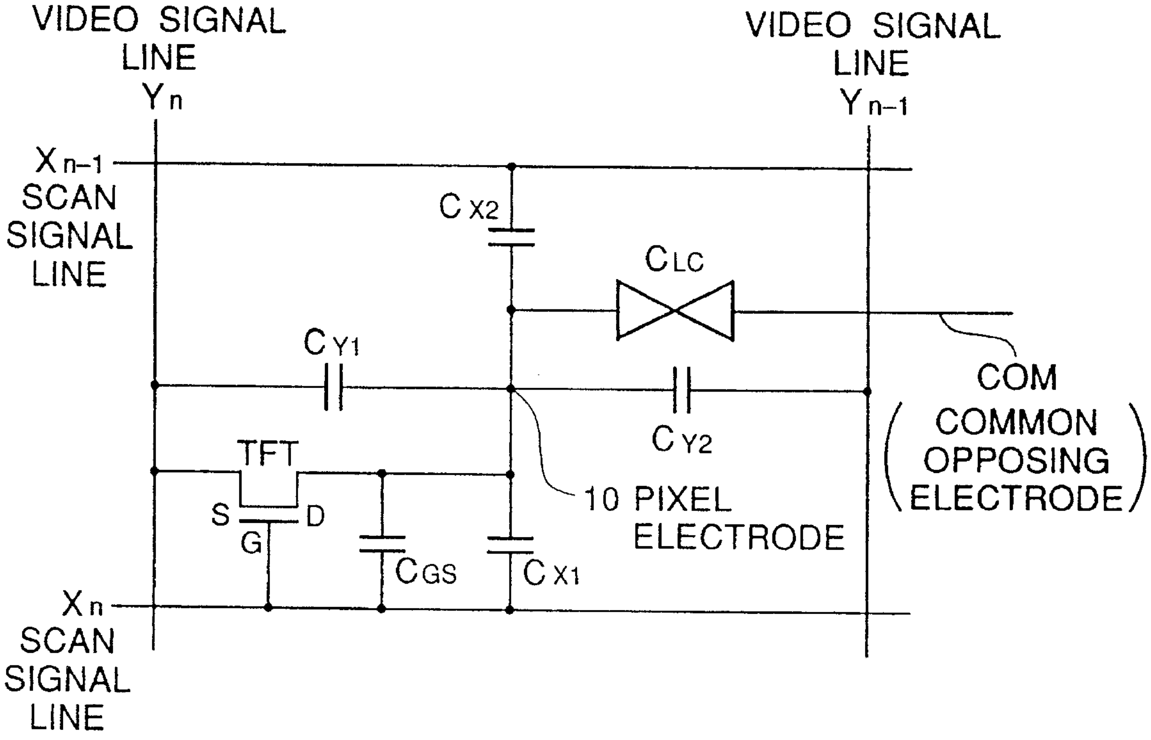
FIGURE 1 PRIOR ART
FIG. 1 is an equivalent circuit of one pixel of an active matrix liquid crystal display panel.
Figure 2:
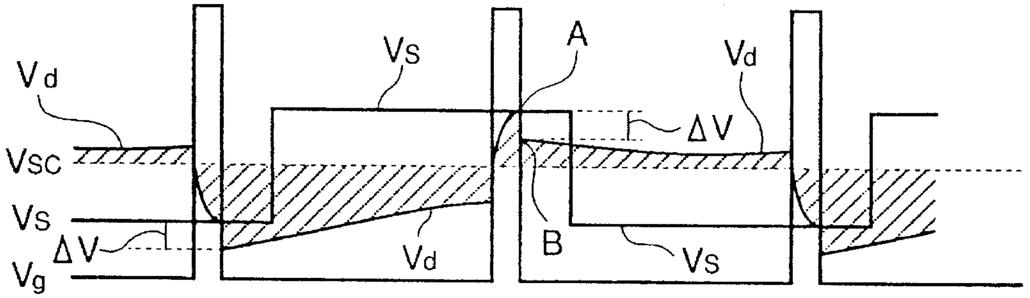
FIGURE 2 PRIOR ART
FIG. 2 illustrates a change in voltage in various electrodes of one pixel in the active matrix liquid crystal display panel when it is driven.
Figures 3A, 3B, 3C, 3D, 3E:
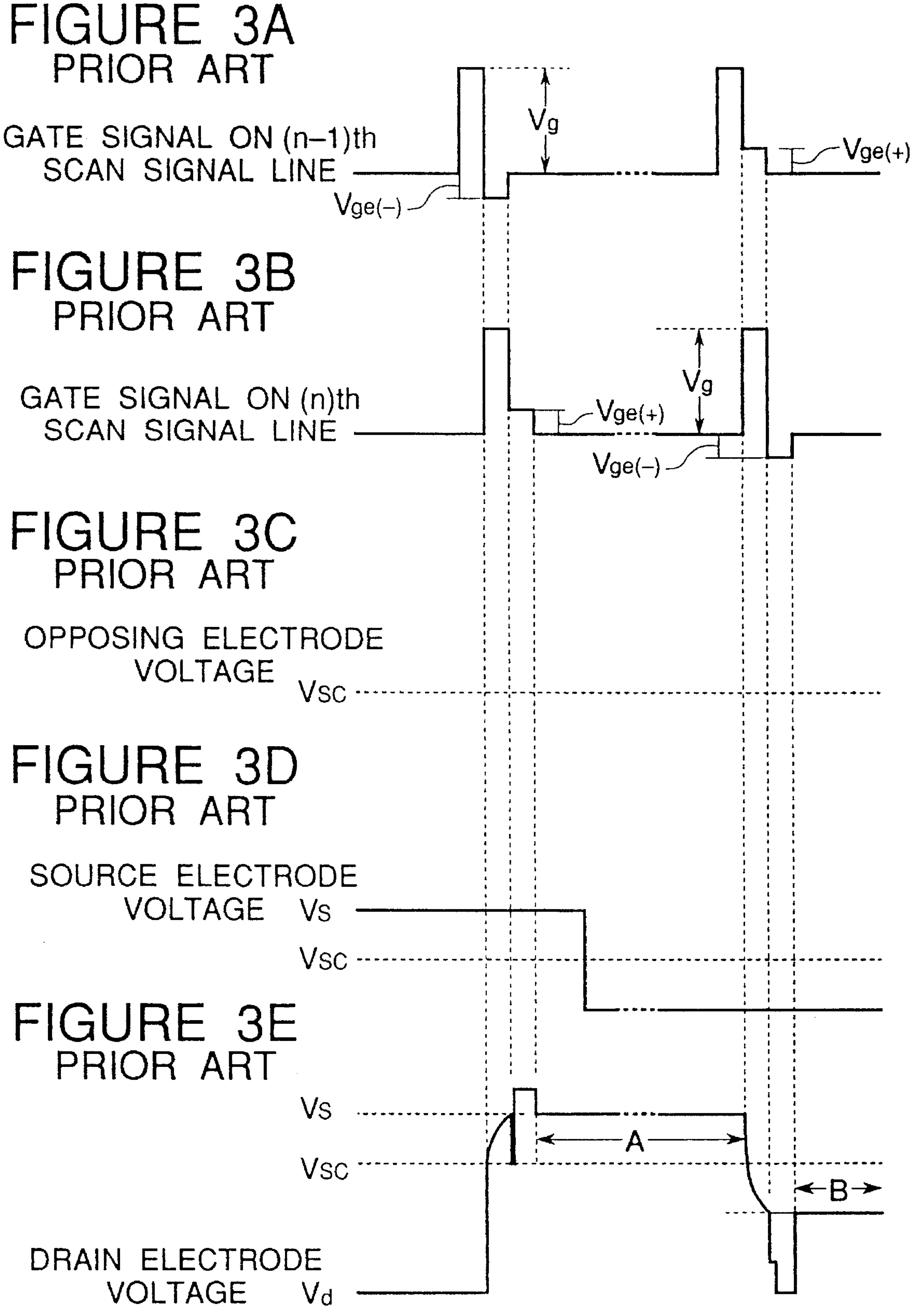
FIGURE 3A PRIOR ART
FIGURE 3B PRIOR ART
FIGURE 3C PRIOR ART
FIGURE 3D PRIOR ART
FIGURE 3E PRIOR ART
FIGS. 3A to 3E are waveform diagrams illustrating a change in voltage in various electrodes of one pixel in the active matrix liquid crystal display panel in accordance with the conventional feed-through compensating method.
Figure 5A:
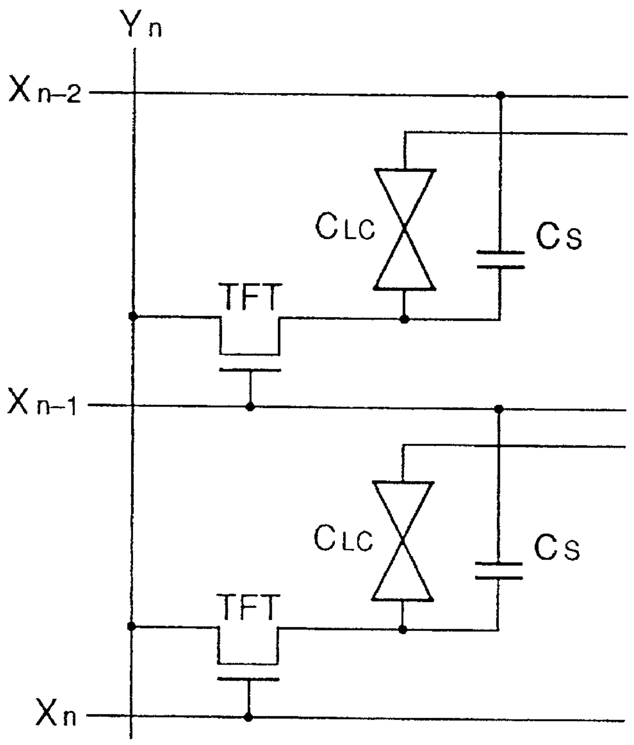
FIG. 5A is an equivalent circuit of one pixel of an active matrix liquid crystal display panel in which one electrode of the storage electrode is formed of a portion of the gate electrode of the thin film transistor connected to the just preceding scan signal line.

In this embodiment, it is assumed that each pixel has various capacitances shown in FIG. 1, and that as shown in FIG. 5A, a drain of a thin film transistor TFT having its gate and its source connected to the scan signal line Xn and the video signal line Yn, respectively, is connected to one electrode of a storage capacitor Cs having its other electrode which is connected to the just preceding scan signal line Xn−1, and namely, which is formed of a portion of the gate electrode of the thin film transistor connected to the just preceding scan signal line Xn−1.

As shown in FIGS. 4A and 4B, to each of the scan signal lines Xn−1, Xn, etc., there is supplied a selection signal XG composed of a scan signal having a voltage Vg and a signal width of one horizontal scan period during which the associated thin film transistor is maintained on in the scanning operation, and a modulation signal having a voltage Vg and a signal width of two horizontal scan periods. Here, a total capacitance C of each one pixel in the equivalent circuit shown in FIG. 1 is expressed as follows:

$$C=C_{LC}+C_{GS}+C_{X1}+C_{X2}+C_{Y1}+C_{Y2}$$

In addition, it is also assumed as follows:

$$Cn=C_{GS}+C_{X1}$$

$$Cn-1=C_{X2}$$

Now, at a timing A in FIGS. 4A to 4D, namely, when the signal XG applied to the gate electrode of the (n)th thin film transistor TFT connected to the scan signal line Xn changes form a low level to a high level, the voltage change $\Delta V_1$ of the pixel electrode 10 is expressed as follows:

$$\Delta V_1=-(Vg+Vx)Cn/C$$

Furthermore, the voltage change $\Delta V_2$ of the pixel electrode 10 when the signal XG is at the high level (timing B) and the voltage change $\Delta V_3$ of the pixel electrode 10 when the signal XG changes from the high level to the low level (timing C) are expressed as follows, respectively:

$$\Delta V_2=Vx\cdot Cn-1/C$$

$$\Delta V_3=Vx\cdot Cn/C$$

Accordingly, in order to compensate the feed-through voltages $\Delta V_1$, $\Delta V_2$ and $\Delta V_3$, it is sufficient if $\Delta V_1+V_2+\Delta XV_3=0$. Therefore, $\Delta V_1+\Delta V_2+\Delta V_3=\{-Cn(Vg+Vx)/C\}+\{Vx\cdot Cn-1/C\}+\{Vx\cdot Cn/C\}=0\{-Vg\cdot Cn\}/C+\{Vx\cdot Cn-1\}/C=0$ $Vx=Vg\cdot Cn/Cn-1$ Namely, Vx is set to fulfil the above mentioned relation.

Now, operation of the first embodiment compensating the above mentioned feed-through voltage will be described.

As shown in FIGS. 4A and 4B, the selection signal XG can assume a first potential $X_{DD}$ which is a high voltage, a second potential $V_{EE1}$ which is lower than the first potential $X_{DD}$ and which constitutes a reference voltage, and a third potential $V_{EE2}$ which is lower than the second potential $X_{EE1}$. The selection signal XG is caused to elevate from the second potential $V_{EE1}$ to the first potential $X_{DD}$ (scan signal voltage Vg) and is maintained at the first potential $X_{DD}$ during one horizontal scan period. Thereafter, the selection signal $X_{DD}$ is caused to drop to the third potential $V_{EE2}$ (modulation signal voltage Vx) and is maintained at the third potential $V_{EE2}$ during two horizontal Scan periods. Then, the selection signal XG is caused to return to the second potential $V_{EE1}$ and is maintained at the second potential $V_{EE1}$ until a corresponding scan period of a next field. This selection signal is supplied to each of the scan signal lines, but the selection signal supplied to each scan signal line is phase-delayed one horizontal scan period from the selection signal supplied to a just preceding scan signal line.

Accordingly, for example, the first potential $V_{DD}$ is supplied to the gate of the thin film transistor connected to the (n−1)th scan signal line during one horizontal scan period so that the thin film transistor is turned on, and thereafter, the gate voltage is caused to drop to the third potential $V_{EE2}$ so that the thin film transistor is turned off. In synchronism with the falling down of the gate voltage of the thin film transistor connected to the (n−1)th scan signal line, the gate voltage of the thin film transistor connected to the (n)th scan signal line is caused to elevate from the second potential $V_{EE1}$ to the first potential $V_{DD}$. After the gate voltage is maintained at the first potential $V_{DD}$ during one horizontal scan period, the gate voltage is caused to drop to the third potential $V_{EE2}$. During a period in which the gate voltage of the thin film transistor connected to the (n)th scan signal line is maintained at the third potential $V_{EE2}$, the gate voltage of the thin film transistor connected to the (n−1)th scan signal line is caused to return from the third potential $V_{EE2}$ to the second potential $V_{EE1}$. Thereafter, the gate voltage of the thin film transistor connected to the (n)th scan signal line is caused to return from the third potential $V_{EE2}$ to the second potential $V_{EEI}$.

Referring to FIG. 4C, the video signal Vs is maintained during one frame period (odd-numbered field) at a high level which higher than the voltage Vsc of the opposing electrode COM, and during a next one period (even-numbered field) at a low level which is lower than the voltage Vsc of the opposing electrode COM. As shown in FIG. 4D, during the high level period of the video signal Vs, the voltage Vg of the selection signal XG is applied to the gate electrode of the thin film transistor connected to the scan signal line Xn, so that the thin film transistor is turned on, and therefore, the drain electrode of the thin film transistor, namely, the voltage Vd of the pixel electrode is caused to elevate to a potential equal to the high level of the video signal Vs (from the timing A to the timing B). This elevated potential Vd drops in response to the drop of the selection signal XG from the voltage Vg to the potential $V_{EE2}$ at the timing B. This voltage drop is $\Delta V_1$ (=−(Vg+Vx)Cn/C).

When the two horizontal period of the voltage $V_{EE2}$ on the just preceding scan signal line Xn−1 has elapsed and the gate electrode of the thin film transistor connected to the just preceding scan signal line Xn−1 is caused to return to the potential $V_{EE1}$, the voltage Vd of the pixel electrode connected to the scan signal line Xn elevates by $\Delta V_2$ (=Vx·Cn−1/C) at the timing C. Furthermore, when the two horizontal period of the voltage $V_{EE2}$ on the scan signal line Xn has elapsed and the gate electrode of the thin film transistor connected to the scan signal line Xn is caused to return to the potential $V_{EE1}$, the voltage Vd of the pixel electrode connected to the scan signal line Xn elevates by $\Delta V_3$(=Vx·Cn/C) at the timing D. Thus, the voltage Vd of the pixel electrode connected to the scan signal line Xn is returned to the potential equal to the high level of the video signal Vs On the other hand, during the low level period (even-numbered field) of the video signal Vs, the voltage Vg of the selection signal XG is applied to the gate electrode of the thin film transistor connected to the scan signal line Xn, similarly to the odd-numbered field, so that the thin film transistor is turned on, and therefore, the drain electrode of the thin film transistor, namely, the voltage Vd of the pixel electrode is caused to drop to a potential equal to the low level of the video signal Vs (from the timing E to the timing F). This dropped potential Vd further drops by $\Delta V_1$ at the timing F in response to the drop of the selection signal XG from the voltage Vg to the potential $V_{EE2}$, since the selection signal on the just preceding scan signal line Xn−1 has been already caused to drop to the potential $V_{EE2}$. Thereafter, when the two horizontal period of the voltage $V_{EE2}$ on the just preceding scan signal line Xn−1 has elapsed, the voltage Vd of the pixel electrode connected to the scan signal line Xn elevates by $\Delta V_2$ at the timing G. Furthermore, when the two horizontal period of the voltage $V_{EE2}$ on the scan signal line Xn has elapsed, the voltage Vd of the pixel electrode connected to the scan signal line Xn elevates by $\Delta V_3$ at the timing H. Thus, the voltage Vd of the pixel electrode connected to the scan signal line Xn is returned to the potential equal to the low level of the video signal Vs As will be apparent from the above, in the first embodiment of the active matrix liquid crystal display panel driving method in accordance with the present invention, the selection signals XG for turning on the associated thin film transistor have the three different voltage values (the scan signal voltage Vg, the modulation signal voltage Vx and the reference voltage) in each of the odd-numbered fields and the even-numbered fields. Each of the three different voltage values is fixed regardless of whether it is applied to the even-numbered scan signal line or the odd-numbered scan signal line and vice versa, and regardless of whether it is in the odd-numbered field or in the even-numbered field. Although the voltage Vd of the pixel electrode has a variation width of $\Delta V_1$ (=$\Delta V_2$+$\Delta V_3$) during a transition period from the timing A to the timing D in the case of the high level of the video signal Vs and during a transition period from the timing E to the timing H in the case of the low level of the video signal Vs, the relation of $\Delta V_1+\Delta V_2+\Delta V_3=0$ is ensured during the other period. In other words, the feed-through voltage is compensated.

Figure 5B:
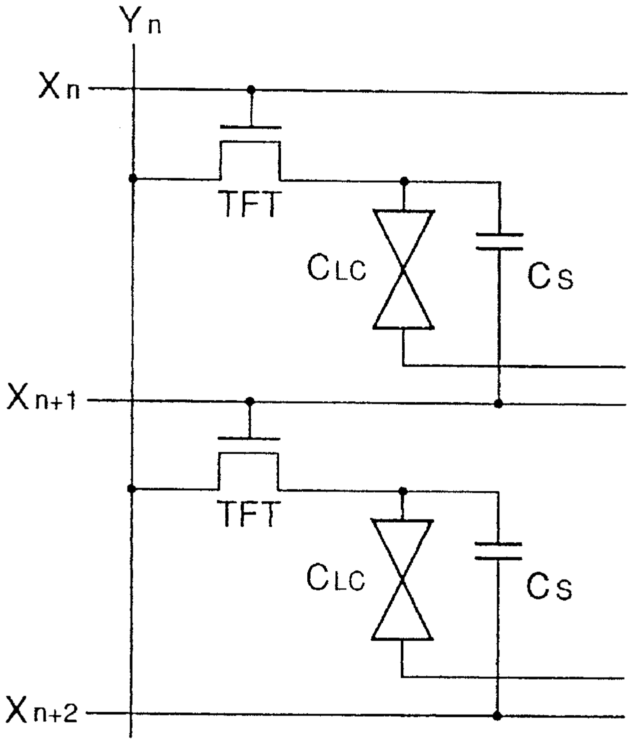
FIG. 5B is an equivalent circuit of one pixel of an active matrix liquid crystal display panel in which one electrode of the storage electrode is formed of a portion of the gate electrode of the thin film transistor connected to the just succeeding scan signal line.

Now, a second embodiment of the active matrix liquid crystal display panel driving method in accordance with the present invention will be described with reference to FIG. 5B and FIGS. 6A to 6D. In this second embodiment, as shown in FIG. 5B, a drain of a thin film transistor TFT having its gate and its source connected to the scan signal line Xn and the video signal line Yn, respectively, is connected to one electrode of a storage capacitor Cs having its other electrode which is connected to the just succeeding scan signal line Xn+1, and namely, which is formed of a portion of the gate electrode of the thin film transistor connected to the just succeeding scan signal line Xn+1. In this case, the modulation signal Vx is superimposed before the scan signal Vg.

Referring to the equivalent circuit shown in FIG. 1, again, the following relation can be found:

$$C=C_{LC}+C_{GS}+C_{X1}+C_{X2}+C_{Y1}+C_{Y2}$$

$$Cn=C_{GS}+C_{X1}$$

$$Cn+1=C_{X2}$$

Now, when the signal XG applied to the gate electrode of the (n)th thin film transistor TFT connected to the scan signal line Xn changes form a low level (−Vx) to a high level (+Vg) (from the timing A to the timing B in FIGS. 6A to 6D), the voltage change $\Delta V_1$ of the pixel electrode 10 (the pixel electrode capacitance $C_{LC}$) is expressed as follows:

$$\Delta V_1=-Vg\cdot Cn/C$$

Furthermore, the voltage change $\Delta V_2$ of the pixel electrode 10 when the signal XG on the scan signal line Xn+1 changes form a low level (−Vx) to a high level (+Vg) (timing B) and the voltage change $\Delta V_3$ of the pixel electrode 10 when the signal XG on the scan signal line Xn+1 changes from the high level (+Vg) to the low level (timing C) are expressed as follows, respectively:

$$\Delta V_2=(Vg+Vx)Cn+1/C$$

$$\Delta V_3=-Vg\cdot Cn+1/C$$

Accordingly, in order to compensate the feed-through voltages $\Delta V_1$, $\Delta V_2$ and $\Delta V_3$, it is sufficient if $\Delta V_1+\Delta V_2+\Delta V_3=0$. Therefore, $\Delta V_1+\Delta V_2+\Delta V_3=\{-Vg\cdot Cn/C\}+\{(Vg+Vx)Cn+1/C\}-\{Vg\cdot Cn+1/C\}=0\{-Vg\cdot Cn\}/C+\{Vx\cdot Cn+1\}/C=0$
$Vx=Vg\cdot Cn/Cn+1$ Namely, Vx is set to fulfil the above mentioned relation.

Now, operation of the second embodiment compensating the above mentioned feed-through voltage will be described with reference to FIGS. 6A to 6D.

Figures 6A, 6B, 6C, 6D:
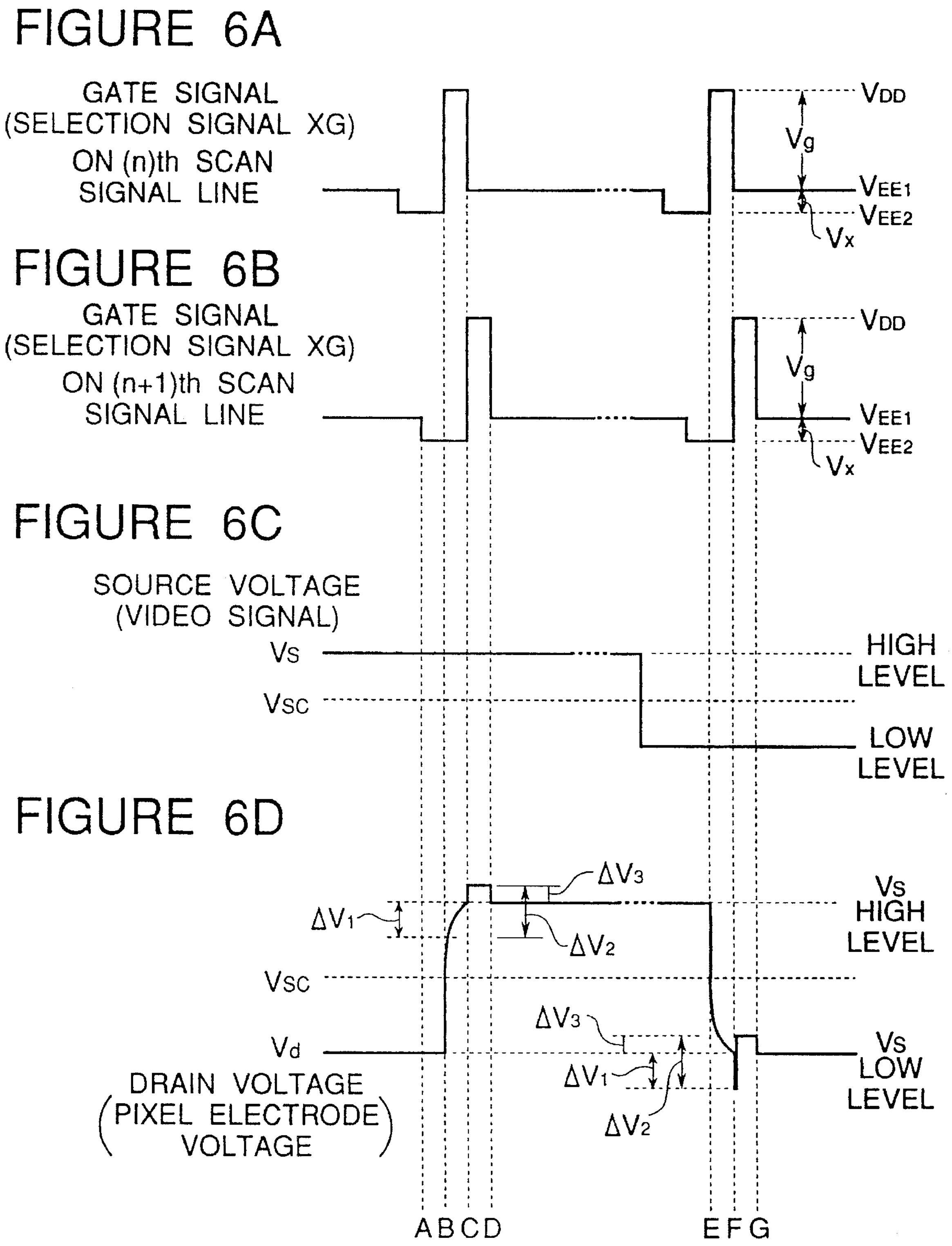
FIGS. 6A to 6D are waveform diagrams illustrating a change in voltage in various electrodes of one pixel in the active matrix liquid crystal display panel in accordance with a second embodiment of the active matrix liquid crystal display panel driving method in accordance with the present invention.

In FIGS. 6A and 6B, a first potential $X_{DD}$, a second potential $V_{EE1}$ and a third potential $V_{EE2}$ are similar to those of the first embodiment. FIG. 6A shows the waveform of a signal applied to the gate electrode of the thin film transistor connected to an (n)th scan signal line Xn, and FIG. 6B shows the waveform of a signal applied to the gate electrode of the thin film transistor connected to an (n+1)th scan signal line Xn+1. FIG. 6C indicates the waveform of the video signal on the video signal line Yn applied to the source electrode of the thin film transistor, and FIG. 6D illustrates the change of the voltage Vd on the pixel electrode.

As shown in FIGS. 6A and 6B, the selection signal XG supplied to the scan signal line Xn is maintained at the third potential $X_{EE2}$ during two horizontal scan periods by superimposing the modulation signal −Vx, and thereafter, is caused to immediately elevate to the first potential $X_{DD}$ by immediately applying the scan signal voltage Vg at the same time when the selection signal XG is returned to the second potential $X_{EE1}$. This scan signal voltage Vg of the selection signal XG is maintained during one horizontal scan period. Thereafter, the selection signal XG is caused to return to the second potential $V_{EE1}$ and is maintained at the second potential $V_{EE1}$ until a corresponding scan period of a next field. This selection signal is supplied to each of the scan signal lines, but the selection signal supplied to each scan signal line is phase-delayed one horizontal scan period from the selection signal supplied to a just preceding scan signal line.

Accordingly, for example, when one horizontal scan period has elapsed from the moment the third potential $V_{EE2}$ is applied to the scan signal line Xn, the third potential $V_{EE2}$ is applied to the scan signal line Xn+1. Then, when one horizontal scan period has elapsed from the moment the third potential $V_{EE2}$ is applied to the scan signal line Xn+1, the scan signal voltage Vg is applied to the scan signal line Xn.

Accordingly, the first potential $V_{DD}$ is supplied to the gate of the thin film transistor connected to the (n)th scan signal line Xn during one horizontal scan period so that the thin film transistor is turned on, and thereafter, the gate voltage is caused to drop to the second potential $V_{EE1}$ so that the thin film transistor is turned off. In synchronism with the falling down of the gate voltage of the thin film transistor connected to the (n)th scan signal line Xn, the first potential $V_{DD}$ is supplied to the gate voltage of the thin film transistor connected to the (n+1)th scan signal line Xn+1 so that the thin film transistor connected to the (n+1)th scan signal line Xn+1 is turned on. After the gate voltage is maintained at the first potential VDD during one horizontal scan period, the gate voltage is caused to drop to the second potential $V_{EE1}$, so that the thin film transistor connected to the (n+1)th scan signal line Xn+1 is turned off.

Referring to FIG. 6C, the video signal Vs is maintained during one frame period (odd-numbered field) at a high level which higher than the voltage Vsc of the opposing electrode COM, and during a next one period (even-numbered field) at a low level which is lower than the voltage Vsc of the opposing electrode COM.

As shown in FIG. 6D, during the high level period of the video signal Vs, when the voltage Vg of the selection signal XG is applied to the gate electrode of the thin film transistor connected to the scan signal line Xn, the thin film transistor is turned on, and therefore, the drain electrode of the thin film transistor, namely, the voltage Vd of the pixel electrode is caused to elevate to a potential corresponding to the high level of the video signal Vs (from the timing B to the timing C). At this time, since the scan signal line Xn+1 is brought to the third potential $V_{EE2}$ before the voltage Vg of the selection signal XG is applied to the gate electrode of the thin film transistor connected to the scan signal line Xn, the voltage Vd of the pixel electrode connected to the thin film transistor connected to the scan signal line Xn is lower than the high level of the video signal Vs by $\Delta V_1$ (=−(Vg·Cn/C) at the moment B the voltage Vg of the selection signal XG is applied to the gate electrode of the thin film transistor connected to the scan signal line Xn.

This thin film transistor connected to the scan signal line Xn turns off in response to the drop of the selection signal XG from the voltage Vg to the potential $V_{EE1}$ at the timing C. At this time, since the scan signal line Xn+1 is brought to the first potential VDD, the voltage Vd of the pixel electrode connected to the thin film transistor connected to the scan signal line Xn is caused to elevate by $\Delta V_2$(=(Vg+Vx)·Cn/C) (from the timing C to the timing D).

When the scan signal line Xn+1 is caused to return to the potential $V_{EE1}$, the voltage Vd of the pixel electrode connected to the scan signal line Xn drops by $\Delta V_3$ (=−Vg·Cn/C) at the timing D. Thus, the voltage Vd of the pixel electrode connected to the scan signal line Xn is returned to the potential equal to the high level of the video signal Vs. This condition is maintained until the selection signal in the next frame is applied. Accordingly, during a transition period from the timing B to the timing D, the voltage Vd of the pixel electrode has a voltage variation of $\Delta V_2(=\Delta V_1+\Delta V_3)$, but thereafter, the relation of $\Delta V_1+\Delta V_2+\Delta V_3=0$ is ensured during the other period. In other words, the feed-through voltage is compensated.

On the other hand, during the low level period (even-numbered field) of the video signal Vs, the voltage Vg of the selection signal XG is applied to the gate electrode of the thin film transistor connected to the scan signal line Xn, similarly to the odd-numbered field, so that the thin film transistor is turned on, and therefore, the drain electrode of the thin film transistor, namely, the voltage Vd of the pixel electrode is caused to drop to a potential equal to the low level of the video signal Vs (at the timing E). This dropped potential Vd further drops by $\Delta V_1$ (from the timing E to the timing F) since the voltage Vx is superimposed on the selection signal XG applied to the just succeeding scan signal line Xn+1, namely, the third potential $V_{EE2}$ is applied to the just succeeding scan signal line Xn+1. Thereafter, the voltage Vd of the pixel electrode connected to the scan signal line Xn elevates by $\Delta V_2$ at the timing F in response to the voltage Vg supplied to the just succeeding scan signal line Xn+1. When the voltage supplied to the just succeeding scan signal line Xn+1 is returned to the second potential $V_{EE1}$, the voltage Vd of the pixel electrode connected to the scan signal line Xn elevates by $\Delta V_3$ at the timing G. Thus, the voltage Vd of the pixel electrode connected to the scan signal line Xn is returned to the potential equal to the low level of the video signal Vs. This voltage is maintained until the selection signal in the next frame is applied. Accordingly, during a transition period from the timing B to the timing D in the case of the high level of the video signal Vs and during a transition period from the timing E to the timing G in the case of the low level of the video signal Vs, the voltage Vd of the pixel electrode has a voltage variation of $\Delta V_2(=\Delta V_1+\Delta V_3)$, but during the other period, the relation of $\Delta V_1+\Delta V_2+\Delta V_3=0$ is ensured during the other period. In other words, the feed-through voltage is compensated.

As will be apparent from the above, in the active matrix liquid crystal display panel driving method in accordance with the present invention, the feed-through can be compensated by the selection signals XG which have only the three different voltage values (the scan signal voltage Vg, the modulation signal voltage Vx and the reference voltage) in each of the odd-numbered fields and the even-numbered fields. A necessary driving circuit can be made simple in comparison with that for performing the convention driving method that needs four different voltage conditions. Accordingly, the driving circuit can composed with a reduced number of circuit elements and can be driven with a reduced power consumption.

The invention has thus been shown and described with reference to the specific embodiments. However, it should be noted that the present invention is in no way limited to the details of the illustrated structures but changes and modifications may be made within the scope of the appended claims.

I claim:

1. A method for driving an active matrix liquid crystal display panel which includes a plurality of video signal lines and a plurality of scan signal lines arranged in the form of a matrix, a plurality of thin film transistors each located on one of intersections between said video signal lines and said scan signal lines, pixel electrodes and storage capacitors, each of said thin film transistors having a gate electrode connected to a corresponding scan signal line, and source and drain electrodes, said source electrode being connected to a corresponding video signal line, said drain electrode being connected to one electrode of a corresponding storage capacitor and a corresponding pixel electrode, and a liquid crystal material sandwiched between said pixel electrode and a common opposing electrode, the method comprising the steps of sequentially supplying a selection signal composed of a scan signal superimposed with a modulation signal, to said scan signal lines one by one, so as to turn on the thin film transistors connected to a scan signal line applied with said selection signal so that a video signal is applied from each of said video signal lines through the associated turned-on thin film transistor to the corresponding pixel electrode and stored in the corresponding storage capacitor, whereby an image is displayed, said selection signal being configured to assume a first potential (VDD) which is a high voltage, a second potential (VEE1) which is lower than said first potential, and a third potential (VEE2) which is lower than said second potential, and controlling said selection signal in a given frame to elevate from said second potential to said first potential so that said selection signal is maintained at said first potential during one horizontal scan period, and then, to drop to said third potential so that said selection signal is maintained at said third potential during two horizontal scan periods, and thereafter, to return to said second potential so that said selection signal is maintained at said second potential until a next frame.

2. A method claimed in claim 1, wherein said first potential (VDD), said second potential (VEE1) and said third potential (VEE2) are set to fulfill the following condition:

$VDD-VEE1=Vg$ $VEE1-VEE2=Vx$ $Vx=Vg\cdot Cn/Cn+1$, where $Cn=CGS+CX1$;

$Cn+1=CX2$;

CGS is an overlap capacitance between the gate electrode and the source electrode in said thin film transistor;

CX1 is a capacitance between the corresponding pixel electrode and the scan signal line to which the gate electrode of said thin film transistor is connected; and

CX2 is a capacitance between the corresponding pixel electrode and a scan line positioned just before or next to the scan signal line to which the gate electrode of the thin film transistor is connected.

3. In a method for driving an active matrix liquid crystal display panel having film transistors, scan signal lines, video signal lines, pixel electrodes and storage capacitors, a selection signal composed of a scan signal superimposed with a modulation signal is sequentially supplied to the scan signal lines one by one, so as to turn on the thin film transistors connected to a scan signal line supplied with the selection signal so that a video signal is applied from each of the video signal lines through the associated turned-on thin film transistor to a corresponding pixel electrode and stored in a corresponding storage capacitor, whereby an image is displayed, the selection signal being configured to assume a first potential (VDD) which is a high voltage, a second potential (VEE1) which is lower than the first potential, and a third potential (VEE2) which is lower than the second potential, and the selection signal is controlled in a given frame so that before or after the selection signal is brought to the first potential, the selection signal is brought to the third potential, and finally, the selection signal is returned to and is maintained at the second potential until a next frame, said first potential (VDD), said second potential (VEE1) and said third potential (VEE2) being set to fulfill the following condition:

$VDD-VEE1=Vg$ $VEE1-VEE2=Vx$ $Vx=Vg\cdot Cn/Cn+1$, where $Cn=CGS+CX1$;

$Cn+1=CX2$;

CGS is an overlap capacitance between a gate electrode and a source electrode in each thin film transistor;

CX1 is a capacitance between the corresponding pixel electrode and the scan signal line to which the gate electrode of the thin film transistor is connected; and CX2 is a capacitance between the corresponding pixel electrode and a scan line positioned just before or next to the scan signal line to which the gate electrode of the thin film transistor is connected.

4. A method for driving an active matrix liquid crystal display panel which includes a plurality of video signal lines and a plurality of scan signal lines arranged in the form of a matrix, a plurality of thin film transistors each located on one of intersections between said video signal lines and said scan signal lines, pixel electrodes and storage capacitors, each of said thin film transistors having a gate electrode connected to a corresponding scan signal line, and source and drain electrodes, said source electrode being connected to a corresponding video signal line, said drain electrode being connected to one electrode of a corresponding storage capacitor and a corresponding pixel electrode, and a liquid crystal material sandwiched between said pixel electrode and a common opposing electrode, the method comprising the steps of sequentially supplying a selection signal composed of a scan signal superimposed with a modulation signal, to said scan signal lines one by one, so as to turn on the thin film transistors connected to a scan signal line applied with said selection signal so that a video signal is applied from each of said video signal lines through the associated turned-on thin film transistor to the corresponding pixel electrode and stored in the corresponding storage capacitor, whereby an image is displayed, said selection signal being configured to assume a first potential (VDD) which is a high voltage, a second potential (VEE1) which is lower than said first potentials, and a third potential (VEE2) which is lower than said second potential, and controlling said selection signal in a given frame to elevate from said second potential to said first potential so that said selection signal is maintained at said first potential during one horizontal scan period, and then, to drop to said third potential so that said selection signal is maintained at said third potential during two horizontal scan periods, and thereafter, to return to said second potential so that said selection signal is maintained at said second potential until a next frame, wherein said first potential (VDD), said second potential (VEE1) and said third potential (VEE2) are set to fulfill the following condition:

$VDD-VEE1=Vg$ $VEE1-VEE2=Vx$ $Vx=Vg\cdot Cn/Cn+1$, where $Cn=CGS+CX1$;

$Cn+1=CX2$;

CGS is an overlap capacitance between the gate electrode and the source electrode in said thin film transistor;

CX1 is a capacitance between the corresponding pixel electrode and the scan signal line to which the gate electrode of said thin film transistor is connected;

CX2 is a capacitance between the pixel electrode and a scan line just before or next to the scan signal line to which the gate electrode of the thin film transistor is connected.

* * * * *